United States Patent
Du

(10) Patent No.: US 11,623,870 B2
(45) Date of Patent: Apr. 11, 2023

(54) METHODS THAT PURIFY URANIUM

(71) Applicant: UT-Battelle, LLC, Oak Ridge, TN (US)

(72) Inventor: Miting Du, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 314 days.

(21) Appl. No.: 17/100,188

(22) Filed: Nov. 20, 2020

(65) Prior Publication Data

US 2021/0155493 A1 May 27, 2021

Related U.S. Application Data

(60) Provisional application No. 62/938,683, filed on Nov. 21, 2019.

(51) Int. Cl.
*C01F 17/10* (2020.01)
*C01F 17/206* (2020.01)

(52) U.S. Cl.
CPC ............ *C01F 17/10* (2020.01); *C01F 17/206* (2020.01)

(58) Field of Classification Search
CPC .............................. C01F 17/10; C01F 17/206
See application file for complete search history.

(56) References Cited

FOREIGN PATENT DOCUMENTS

| WO | 2009013759 A1 | 1/2009 | |
|---|---|---|---|
| WO | WO-2014018422 A1 * | 1/2014 | ............ B01J 39/05 |

* cited by examiner

*Primary Examiner* — Coris Fung
*Assistant Examiner* — Catriona M Corallo
(74) *Attorney, Agent, or Firm* — Lempia Summerfield Katz LLC

(57) ABSTRACT

A method for purifying uranium includes forming primary uranyl peroxide precipitates ($UO_2O_2 \cdot 4H_2O$). Forming the primary uranyl peroxide precipitates includes obtaining impure uranium dissolved in an acidic solution, evaporating the acidic solution to increase uranium concentration and to form a concentrated solution, mixing a hydrogen peroxide ($H_2O_2$) solution with the concentrated solution in a first container, and forming uranyl peroxide precipitates in the first container. The method includes collecting the uranyl peroxide precipitates and washing and drying the uranyl peroxide precipitates. The method also includes converting the washed and dried uranyl peroxide precipitates into triuranium octoxide ($U_3O_8$).

20 Claims, 12 Drawing Sheets

```
                  ┌──────────────────────────────────────┐
                  │  Obtain impure uranium dissolved in  │── 302
                  │              an acidic solution      │
                  └──────────────────┬───────────────────┘
                                     ↓
              ┌──────────────────────────────────────────┐
              │  Evaporate the acidic solution to        │── 304
              │  increase the uranium concentration      │
              │  and form a concentrated solution        │
              └──────────────────┬───────────────────────┘
                                 ↓
              ┌──────────────────────────────────────────┐
              │  Mix H₂O₂ and optionally, NaOH, with the │── 306
              │  concentrated solution in a first        │
              │  container                               │
              └──────────────────┬───────────────────────┘
                                 ↓
              ┌──────────────────────────────────────────┐
              │  Form primary UO₂O₂·4H₂O in the first    │── 308
              │  container                               │
              └──────────────────┬───────────────────────┘
```

Flowchart 300:

- 302: Obtain impure uranium dissolved in an acidic solution
- 304: Evaporate the acidic solution to increase the uranium concentration and form a concentrated solution
- 306: Mix $H_2O_2$ and optionally, NaOH, with the concentrated solution in a first container
- 308: Form primary $UO_2O_2 \cdot 4H_2O$ in the first container
- 310: Transfer the supernate from the first container to a second container
- 312: Rinse the primary $UO_2O_2 \cdot 4H_2O$ and transfer the rinsed liquid to the second container
- 314: Mix $H_2O_2$ into the second container
- 316: Form secondary $UO_2O_2 \cdot 4H_2O$ in the second container

FIG. 3

METHODS THAT PURIFY URANIUM

RELATED APPLICATION

This application claims priority to provisional application Ser. No. 62/938,683 filed on Nov. 21, 2019, titled "Method That Purify Uranium," which is herein incorporated by reference in its entirety.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

TECHNICAL FIELD

This application relates to the purification of uranium, and specifically relates to the method of uranium purification by cascade precipitation of uranyl peroxide in a highly acidic condition.

BACKGROUND

Uranium is used as fuel in nuclear power reactors to generate electricity. It is also used in medicine, industrial processing, and other sectors. Mined uranium used in these sectors is purified and calcined to form triuranium octoxide ($U_3O_8$). Conventionally, uranium is purified by chemical processes that use solvent for extraction or resins for ion exchanges. However, these methods may process only limited amounts of uranium in each batch. To achieve large processing capacity, significant amounts of equipment is needed. Furthermore, the conventional methods produce large volumes of liquid waste.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like-referenced numerals designate corresponding parts throughout the different views.

DETAILED DESCRIPTION

The disclosed methods improve the purification of uranium (e.g., uranium isotopes and uranium decayed products). The methods form uranyl peroxide ($UO_2O_2 \cdot xH_2O$) precipitates from uranyl solution in a highly acidic condition. As used herein, the term "highly acidic solution" may refer to a solution having a hydrogen ion concentration, [$H^+$], of at least 0.1 M (i.e., lower than pH 1). In certain examples, a highly acidic solution refers to a solution having a hydrogen ion concentration, [$H^+$], of at least 1 M, at least 2 M, at least 3 M, at least 4 M, at least 5 M, at least 6 M, at least 7 M, at least 8 M, in a range of 0.1-8 M, in a range of 1-8 M, or in a range or 2-8 M. Such methods disclosed herein are significantly more acidic than traditional approaches (e.g., wherein the pH of the solution may be in a range of 2-8). Further, such a highly acidic solution may be advantageous over traditional approaches in eliminating the possibility of forming impure metal ion hydroxides, including uranium hydroxides, during the generation of uranium peroxide precipitates.

The precipitation process may be repeated, (e.g., in multiple stages), to convert the residual uranyl solution with un-precipitated uranium into uranyl peroxide precipitates. Although 100% uranyl peroxide precipitation may not be reached in a single precipitation process, secondary precipitation processes may be performed on the supernate containing the un-precipitated uranium to recover more uranyl peroxide precipitates. The overall uranyl peroxide precipitation rate may be increased to close to 100% by the multi-stage precipitation processes (e.g., the first, second, third precipitation processes, and so forth). The disclosed methods are efficient and effective and have several advantages over the traditional approaches. The $U_3O_8$ formed via these methods have significantly higher purity levels (e.g., recovery rates may be greater than 99% in three or fewer stages of precipitation). The $U_3O_8$ formed have significantly less impurities (e.g., iron), or are substantially free of them. Additionally, the methods disclosed herein are advantageously easy to implement, capable of processing a large quantity of uranium (e.g., more than 100 grams of impure uranium per batch) in shorter time periods, do not rely on significant amounts of equipment, and generate significantly less liquid waste than conventional methods.

Figure 1:
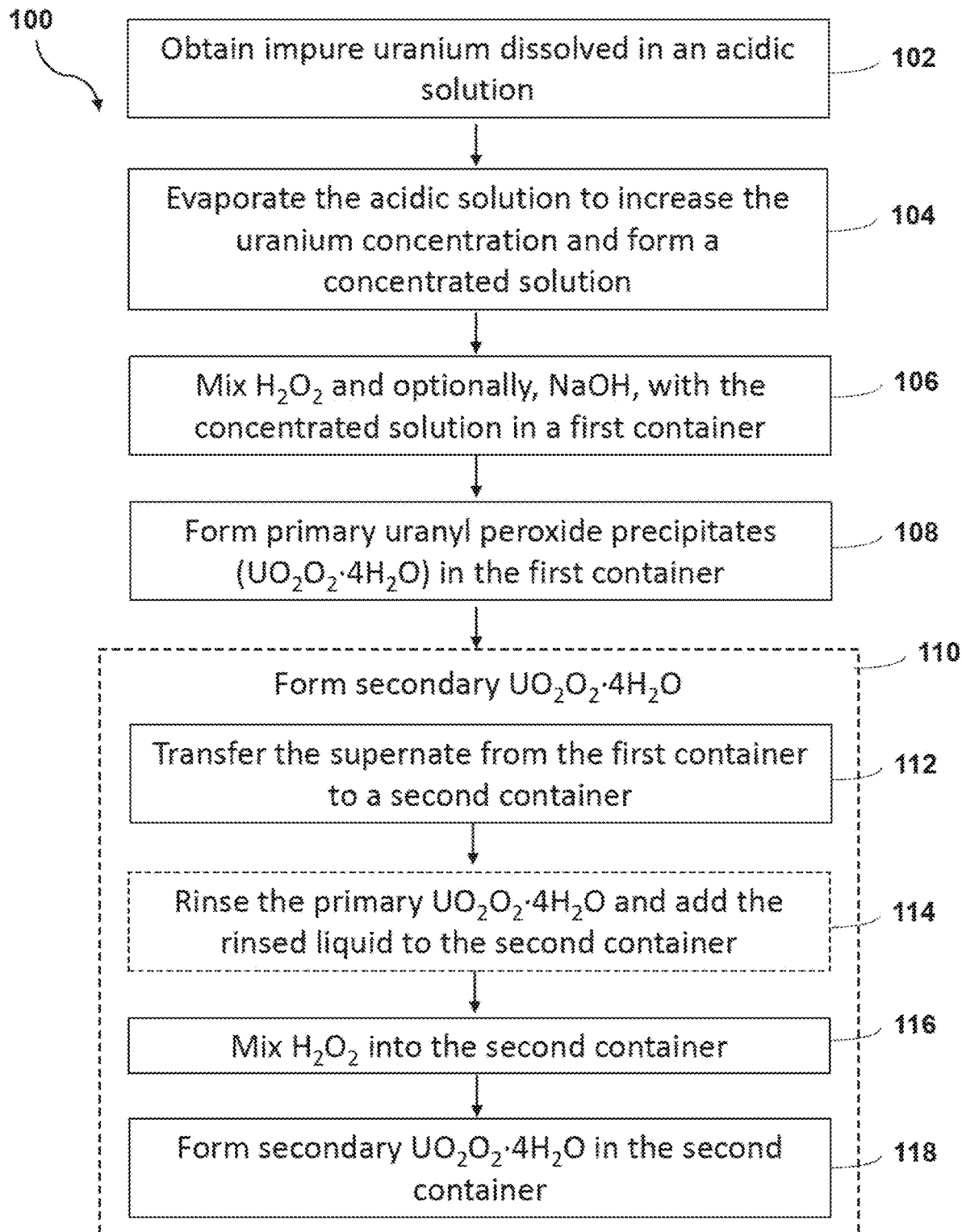
FIG. 1 is an exemplary process for purifying uranium by forming uranyl peroxide precipitates in one or more stages.
Figure 1:
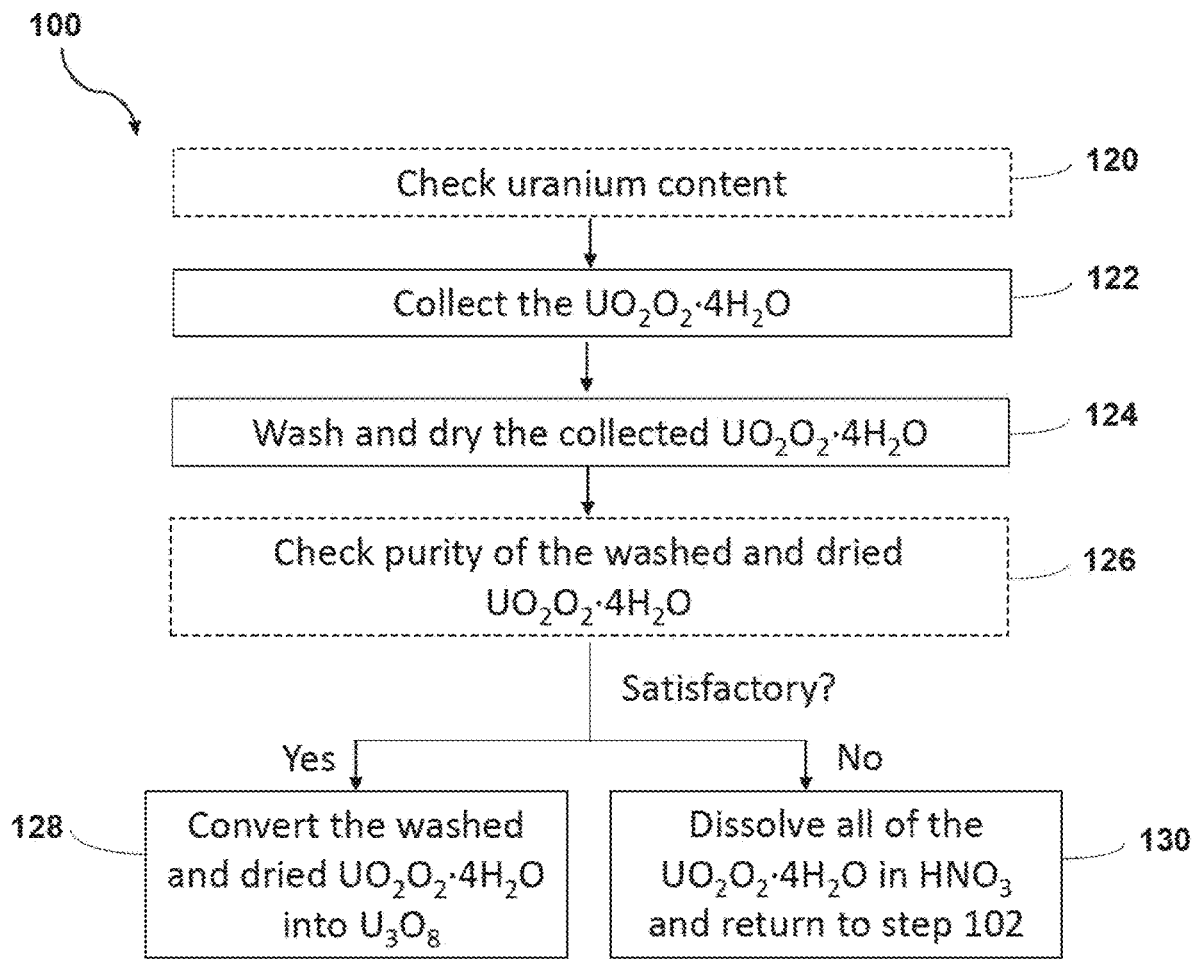

FIG. 1 is an exemplary process 100 for purifying uranium. The process 100 may include obtaining impure uranium dissolved in an acidic solution at step 102. Step 102 may include dissolving impure uranium in a highly acidic solution as defined herein (e.g., having moles of $H^+$ present in solution). The impure uranium may include impurities, such as inert metal ions and/or other contaminants. The impurity concentration may be about 20 gram (g) per 100 g of uranium. The acidic solution may be highly acidic and may be formed from one or more acids, such as nitric acid ($HNO_3$). In some processes, the acidic solution may be formed from mainly $HNO_3$ with a small portion of other acids, such as hydrochloric acid (HCl) and/or sulfuric acid ($H_2SO_4$). In some processes, the $HNO_3$ concentration, [$HNO_3$], may be in a range of 2 moles per liter (M) to 8 M, or about 7.5 M.

It should be noted that although HCl and $H_2SO_4$ may be used in small amounts in combination with $HNO_3$, for several reasons, the acidic solution used for the cascade precipitation method disclosed herein may only include $HNO_3$ or may mainly include $HNO_3$ (e.g., at least 50 wt. %, at least 60 wt. %, at least 70 wt. %, at least 80 wt. %, at least 90 wt. %, at least 95 wt. %, or at least 99 wt. % of the acid in the acidic solution is $HNO_3$). For example, acids containing $Cl^-$ or $SO_4^{2-}$ (as commonly used in uranium mining) have stronger complexing abilities than $NO^{3-}$ and may have a much higher tendency to complexing with $UO_2^{2+}$, resulting in adverse impacts on uranyl peroxide precipitation. In particular, the high [Cl⁻] & [$SO_4^{2-}$] would "drag" uranyl ($UO_2^{2+}$) and hinder the reaction to form uranyl peroxide precipitations.

The process 100 may include evaporating the acidic solution to increase the uranium concentration and form a concentrated solution at step 104. Step 104 may include increasing the uranium concentration to a predetermined value by evaporation of the acidic solution. For example, the acidic solution containing the dissolved impure uranium may be evaporated using an evaporation system (e.g., evaporation flask coupled to a heating device and optionally a stirring device, a magnetic stirrer hot plate). The acidic solution is heated to about its boiling temperature (e.g., within 10° C., within 5° C., or within 1° C. of its boiling temperature). As a portion of the acidic solution evaporates, the uranium concentration remaining in the unevaporated solution increases. The uranium concentration in the acidic solution may be increased to about 250 gram per milliliter (g/mL) or higher by the evaporation process. In some processes, the uranium concentration in the $HNO_3$ solution may be concentrated to at least about 70 g/L at step 104. Using the evaporation process, the concentration of the uranium increases in the remaining, unevaporated $HNO_3$ solution, and the [$HNO_3$] by the end of the evaporation process may be about 15 moles per liter (mol/L or M) or greater than 8 M.

The process 100 may include mixing a solution including hydrogen peroxide ($H_2O_2$), and optionally NaOH, with the concentrated solution in a first container at step 106. Step 106 may include adding and stirring a $H_2O_2$ solution into the concentrated solution. The $H_2O_2$ solution may include $H_2O_2$ balanced by water ($H_2O$), (e.g., water or deionized water). For example, the $H_2O_2$ within the solution may be in a range of 10% to 90% by volume $H_2O_2$, wherein the rest of the $H_2O_2$ solution is water. In certain examples, the $H_2O_2$ may be in a range of 20% to 80% by volume $H_2O_2$, in a range of 30% to 70% by volume $H_2O_2$, in a range of 40% to 60% by volume $H_2O_2$, or in a range of 30% to 50% by volume $H_2O_2$, wherein the rest of the $H_2O_2$ solution is water. For example, the solution may be about 50% $H_2O_2$ and 50% $H_2O$ by volume, about 40% $H_2O_2$ and 60% $H_2O$ by volume, about 30% $H_2O_2$ and 70% $H_2O$ by volume, etc. Step 106 may include adding 30% $H_2O_2$ solution (30 vol. % $H_2O_2$ balanced by 70 vol. % water) into the first container at a 1:1 volume ratio or higher with respect to the concentrated solution (obtained at step 104) (e.g., 1:1 or greater $H_2O_2$ solution: concentrated solution, 2:1 or greater $H_2O_2$ solution: concentrated solution, 3:1 or greater $H_2O_2$ solution: concentrated solution, etc.).

Step 106 may optionally include adding and stirring sodium hydroxide (NaOH), not an ammonia solution ($NH_4OH$), to neutralize the acidic solution to reach a predetermined acidity. Step 106 may include well mixing the solution by methods, such as stirring or using a magnetic stirrer, during and/or after the $H_2O_2$ solution and optionally the NaOH are added.

The purpose of steps 104 and 106 is to prepare the acidic solution for forming uranyl peroxide precipitates ($UO_2O_2 \cdot 4H_2O$). The cascade uranyl peroxide precipitation process disclosed herein is expected to form $UO_2O_2 \cdot 4H_2O$ based on Equation 1.

$$UO_2^{2+} + H_2O_2 + 4H_2O = UO_2O_2 \cdot 4H_2O + 2H^+ \qquad \text{Eq. (1)}$$

Eq. (1) expresses the chemical equilibrium of relevant species towards $UO_2O_2 \cdot 4H_2O$ formation. According to Eq. (1), each mole of uranium stoichiometrically consumes one mole of $H_2O_2$ to generate one mole of $UO_2O_2 \cdot 4H_2O$ along with two moles of H⁺ as a byproduct. For example, 100 g of ²³⁴U (0.427 mole) consumes 0.427 mole of $H_2O_2$ to generate $UO_2O_2 \cdot 4H_2O$ and 0.855 mole of H⁺.

$UO_2O_2 \cdot 4H_2O$ may be formed by driving Eq. (1) in the forward direction, i.e., to the right side of the equation, which may be done by (1) reducing [H⁺] or neutralization of H⁺ or by (2) increasing the reactants, $UO_2^{2+}$ and/or $H_2O_2$. The cascade uranyl peroxide precipitation process disclosed herein works based on the later mechanism, by increasing the concentrations of the reactants. Specifically, step 104 increases the uranium concentration, [$UO_2^{2+}$], and step 106 fuels the reaction with $H_2O_2$. For this reason, the cascade uranyl peroxide precipitation process disclosed herein may form $UO_2O_2 \cdot 4H_2O$ without neutralization of H⁺. In some processes, by evaporation of the acidic solution at step 104, the [H⁺] or [$HNO_3$] may be greater than 8 M, about 15 M. Therefore, at least four times the stoichiometric ratio of the $H_2O_2$ may be added into the concentrated solution at step 106 to selectively precipitate $UO_2O_2 \cdot 4H_2O$.

In some processes, in step 106, the ultrapure $H_2O_2$ solution are in 30% w/w (i.e., 1 liter of 30% $H_2O_2$ contains 300 mL of pure $H_2O_2$ with 700 mL $H_2O$). Therefore, at least 4×0.427 mole (1.71 mole) of pure $H_2O_2$ (5.69 mL of 30% $H_2O_2$) is required for purifying 100 g of impure uranium. If 100 g of impure uranium was concentrated in 400 mL of $HNO_3$ solution (the uranium concentration [U]=250 g U/L), the process 100 would require addition of 400 mL of 30% $H_2O_2$ solution into the first container at 1:1 volume ratio with respect to the concentrated solution (obtained at step 104). This would result in 800 mL of solution of [$HNO_3$] at 50% dilution (e.g., if the acidic solution was 15 M $HNO_3$ at step 102, the [$HNO_3$] would be 7.5 M at step 106). The addition of 400 mL of 30% $H_2O_2$ contains 120 mL pure $H_2O_2$, which contains about 3.53 moles $H_2O_2$ (e.g., about 120 g divided by the molecular weight of $H_2O_2$ is about 3.53 moles). About 3.53 moles of $H_2O_2$ is about 8.27 times of 0.427 mole of uranium, which suffices the requirement of at least 4×0.427 mole (1.71 mole) of pure $H_2O_2$ for purifying 100 g of uranium.

The process 100 may include forming primary $UO_2O_2 \cdot 4H_2O$ in the first container at step 108. Step 108 may include setting the acidic solution to form primary uranyl peroxide precipitates ($UO_2O_2 \cdot 4H_2O$) aside and maintaining the acidic solution at room temperature (e.g., 25° C.) for a predetermined period of time for the $UO_2O_2 \cdot 4H_2O$ to form. In other processes, the temperature may be maintained at slightly cooler temperature, (e.g., 20-25° C.), to facilitate the formation of the $UO_2O_2 \cdot 4H_2O$. Uranyl peroxide may precipitate slower if the acidic solution is warmer. The precipitation may take hours, (e.g., 1 to 24 hours, 1 to 12 hours, 1 to 6 hours, etc.), for phase separation to occur.

If there is no $UO_2O_2 \cdot 4H_2O$ formed in step 108, step 104 and/or step 106 may be repeated until a sufficient amount of $UO_2O_2 \cdot 4H_2O$ are formed. In one example, if there is no $UO_2O_2 \cdot 4H_2O$ formed in step 108, the supernate may be evaporated and/or more $H_2O_2$ solution may be added to strengthen the reaction to form $UO_2O_2 \cdot 4H_2O$.

The process 100 may optionally include forming secondary $UO_2O_2 \cdot 4H_2O$ at step 110. Step 110 may include transferring the supernate from the first container to a second container at step 112. Once the primary uranyl peroxide precipitation has significantly slowed or stopped (i.e., the liquid/solid phases are visibly separated) in step 110, the supernate or the liquid portion may be transferred to the second container, and the primary $UO_2O_2 \cdot 4H_2O$ may be kept in the first container. The supernate may be transferred to the second container using pipetting, centrifuging, filtrating, and/or other transfer devices.

Step 110 may optionally include rinsing the primary $UO_2O_2.4H_2O$ and adding the rinsed liquid to the second container at step 114. The primary $UO_2O_2.4H_2O$ may be rinsed with a diluted $H_2O_2$ solution having a larger vol. % water than $H_2O_2$. For example, the diluted $H_2O_2$ solution may have a $H_2O:H_2O_2$ ratio of at least 2:1 by volume, at least 5:1 by volume, at least 10:1 by volume, or about 10:1 by volume). The rinsing step at 114 may be repeated (e.g., two times, three times, four times, etc.).

Step 110 may include mixing $H_2O_2$ into the second container at step 116 and forming secondary $UO_2O_2.4H_2O$ in the second container at step 118. Step 116 may include the process described in step 106. By adding more $H_2O_2$ into the second container and after mixing the solution thoroughly at step 116, the secondary container may be set around room temperature (e.g., 25° C.), and allow the secondary $UO_2O_2.4H_2O$ to form. In some processes, if the primary precipitation occurred in 7.5 M $HNO_3$ (after adding 30% $H_2O_2$ solution up to 1:1 volume ratio at step 106), the supernate transferred into the second container at step 112 would also be about 7.5 M $HNO_3$. The supernate is then diluted by the added rinsed liquid at step 114 and further diluted by the added $H_2O_2$ at step 116. If 30% $H_2O_2$ solution (30% $H_2O_2$ balanced by 70% water) was added to the second container up to 1:1 volume ratio with respect to the solution (obtained in step 114), the solution would be about 3.5 M (7.5 M/2=3.5 M) $HNO_3$. The stage-wise decrease of $[HNO_3]$ is favorable to the formation of $UO_2O_2.4H_2O$, besides increasing the reactant ($UO_2^{2+}$ and $H_2O_2$) concentrations. Although due to the dilution, it may take slightly longer in step 118 than in step 108 to form the secondary $UO_2O_2.4H_2O$.

Step 110 may be repeated to form more secondary $UO_2O_2.4H_2O$ in multiple stages. For example, step 110 may include transferring the supernate from the second container (Container 2) to the third container (Container 3), rinsing the $UO_2O_2.4H_2O$ and adding the rinsed liquid to Container 3, and performing procedure describes in steps 116 and 118 to form secondary $UO_2O_2.4H_2O$ in Container 3. Step 110 may include transferring the supernate from the third container (Container 3) to the fourth container (Container 4), rinsing the $UO_2O_2.4H_2O$ and adding the rinsed liquid to Container 4, and performing procedure describes in steps 116 and 118 to form secondary $UO_2O_2.4H_2O$ in Container 4, and so forth. The $UO_2O_2.4H_2O$ formed in Container 1 are referred to as "primary uranyl peroxide precipitates." The $UO_2O_2.4H_2O$ formed in Containers 2, 3, 4, and so forth are referred to as "secondary uranyl peroxide precipitates." In some processes, step 110 may be omitted, and the process 100 may proceed directly from step 108 to step 120 as described below.

The process 100 may optionally include checking uranium content at step 120. Step 120 may include taking a liquid sample from the container (i.e., Container 3). The liquid include the supernate from transferred from the previous container (i.e., Container 2) and the rinsed liquid for uranium content analysis to determine whether to form more secondary $UO_2O_2.4H_2O$. The uranium content may be analyzed through inductively coupled plasma mass spectrometry (ICP-MS) or other processes. For example, if there was more than about 10%, about 9%, about 8%, about 7%, about 6%, about 5%, about 4%, about 3%, about 2%, or about 1% of uranium (as compared to the amount of uranium, i.e., 100%, at step 102) remained in the liquid, the process 100 may proceed to form more secondary $UO_2O_2.4H_2O$ (i.e., in Contain 3, 4, and so forth).

As may be appreciated, the amount of uranium remained in the liquid decreases with each round of subsequent precipitation, i.e., less uranium in the liquid from Container 2 than in Container 1, and less uranium in the liquid from Container 3 than in Container 2, etc. Step 110 may continue until there is negligible or substantially free of uranium remained in the supernate. With a precipitation efficiency of greater than about 90 wt. %, two stages of precipitations are sufficient to recover about 99 wt. % of uranium, e.g., less than about 1 wt. % uranium may be measured in step 120 when the sample is taken from the liquid in the third container (Container 3). In some processes, step 120 may be optionally performed after step 108 to determine whether to proceed to step 110.

The process 100 may include collecting the $UO_2O_2.4H_2O$ at step 122. Once the uranyl peroxide precipitation has significantly slowed or stopped, the $UO_2O_2.4H_2O$ may be collected using pipetting, for example, to remove the supernate, centrifuging, filtrating. Step 122 may include collecting the primary $UO_2O_2.4H_2O$, collecting the secondary $UO_2O_2.4H_2O$, or both.

The process 100 may include washing and drying the collected $UO_2O_2.4H_2O$ at step 124. The $UO_2O_2.4H_2O$ may be washed with a diluted $H_2O_2$ solution (e.g., $H_2O:H_2O_2$ is 10:1 by volume). The $UO_2O_2.4H_2O$ may then be further washed with ethanol (e.g., ultrapure ethanol, 100% pure ethanol). The washed $UO_2O_2.4H_2O$ may then be dried through forced air, heating at a low temperature (e.g., below 100° C., in a range of 25° C. to 99° C., in a range of 25° C. to 98° C.), or through other processes.

Optionally, the process 100 may include checking purity of the washed and dried $UO_2O_2.4H_2O$ at step 126. Step 126 may include dissolving a portion of the washed and dried $UO_2O_2.4H_2O$ in $HNO_3$ of suitable concentration (e.g., 4 M). In some processes, the $HNO_3$ solution may be heated to an elevated temperature (e.g., in a range of 75° C. to 85° C., below the boiling temperature of $HNO_3$) to help the dissolution of the $UO_2O_2.4H_2O$. The purity of the dissolved $UO_2O_2.4H_2O$ may be analyzed through inductively coupled plasma mass spectrometry (ICP-MS) and other processes.

If the purity of the $UO_2O_2.4H_2O$ is satisfactory, e.g., equal to or greater than a predetermined purity (e.g., 99.99% pure, 99.9% pure, or 99.0% pure), the process 100 may proceed to step 128 to convert the washed and dried $UO_2O_2.4H_2O$ into $U_3O_8$. Step 128 may include applying a heating profile to the washed and dried $UO_2O_2.4H_2O$ for conversion into $U_3O_8$. For example, step 128 may include heating the washed and dried $UO_2O_2.4H_2O$ to about 300° C. and holding the temperature at about 300° C. for about 2 hours, and then heating the precipitates to about 700° C. and holding the temperature at about 700° C. for about 3 hours. The heating profile may be reached through heating sources such as furnaces (e.g., furnaces with air flow supplied during heating).

If the purity of the $UO_2O_2.4H_2O$ is unsatisfactory, e.g., below the predetermined purity, the process 100 may proceed to step 130 to dissolve all of the washed and dried $UO_2O_2.4H_2O$ in $HNO_3$, and the process 100 may return to step 102 to form purer $UO_2O_2.4H_2O$.

Figure 2:
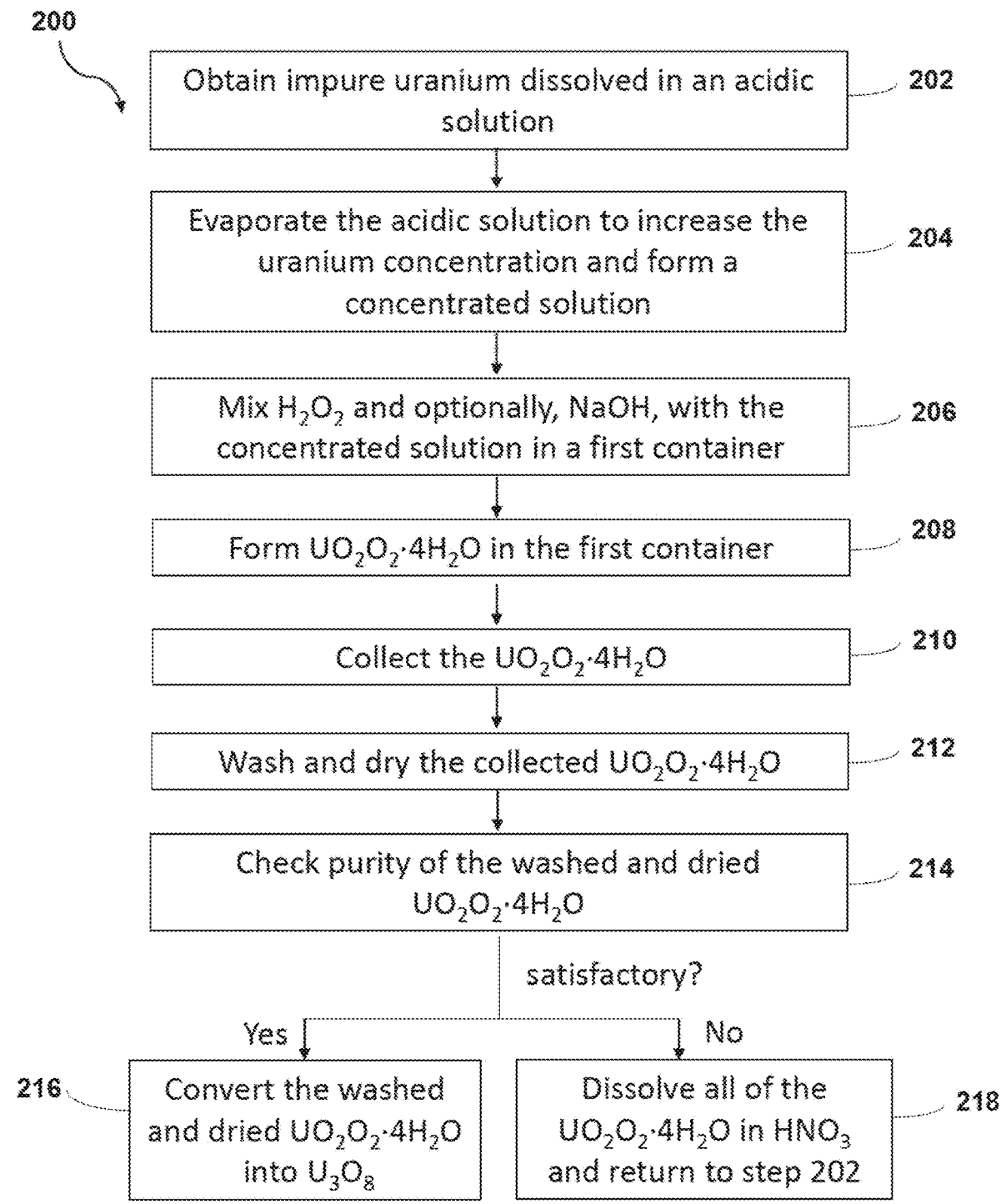
FIG. 2 is an exemplary process that purifies uranium by forming uranyl peroxide precipitates in a single stage.

FIG. 2 is an exemplary process 200 of a cascade method for purifying uranium in one stage (e.g., only primary $UO_2O_2.4H_2O$ are formed). The process 200 may include obtaining impure uranium dissolved in an acidic solution in step 202. The process 200 may include evaporating the acidic solution to increase the uranium concentration and form a concentrated solution in step 204. The process 200 may include mixing $H_2O_2$ and optionally, NaOH, with the concentrated solution in a first container in step 206. The process 200 may include forming $UO_2O_2.4H_2O$ in the first container in step 208. Steps 202 to 208 may include all procedures described in steps 102 to 108 of FIG. 1.

The process 200 may include collecting the $UO_2O_2.4H_2O$ in step 210. Once the uranyl peroxide precipitation has significantly slowed or stopped, the $UO_2O_2.4H_2O$ may be collected using pipetting, for example, to remove the supernate, centrifuging, filtrating.

The process 200 may include washing and drying the collected $UO_2O_2.4H_2O$ in step 212. The process 200 may include checking purity of the washed and dried $UO_2O_2.4H_2O$ in step 214. Steps 212 and 214 may include all procedures described in steps 124 and 126 of FIG. 1. If the purity of the $UO_2O_2.4H_2O$ is satisfactory, e.g., equal to or greater than a predetermined purity (e.g., 99.99% pure, 99.9% pure, or 99.0% pure), the process 200 may proceed to step 216 to convert the washed and dried $UO_2O_2.4H_2O$ into $U_3O_8$. Step 216 may include all procedures described in step 128 of FIG. 1. If the purity of the $UO_2O_2.4H_2O$ is unsatisfactory, e.g., below the predetermined purity, the process 200 may proceed to step 218 to dissolve all of the washed and dried $UO_2O_2.4H_2O$ in $HNO_3$, and the process 200 may return to step 202 to form purer $UO_2O_2.4H_2O$. In some processes, step 214 may be omitted, and the process 200 may proceed directly from step 212 to step 216.

Figure 3:
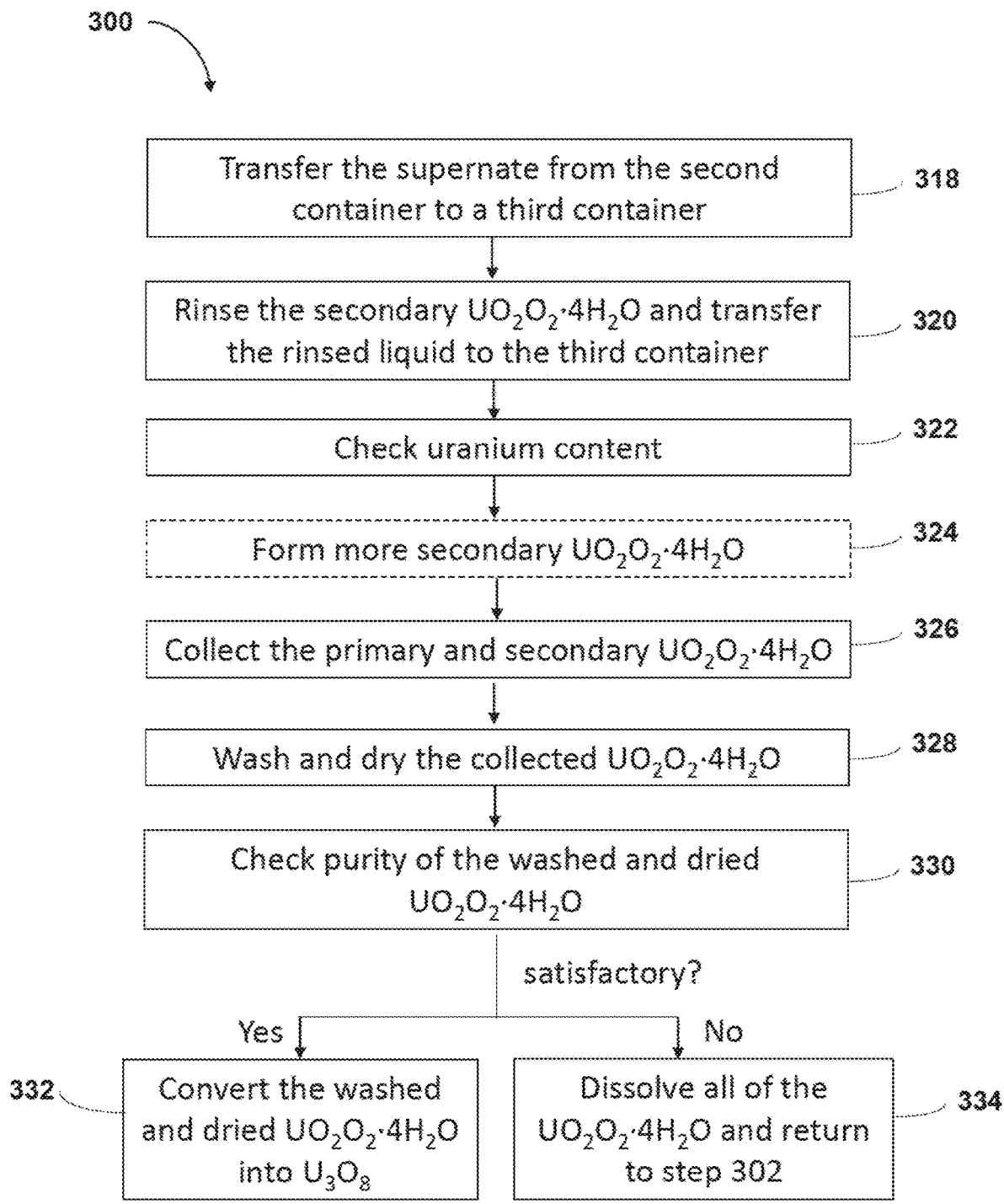
FIG. 3 is an exemplary process that purifies uranium by forming uranyl peroxide precipitates in multiple stages.

FIG. 3 shows another exemplary process 300 of a cascade method for purifying uranium in multiple stages (e.g., the secondary uranyl peroxide precipitates are formed in Containers 2, 3, 4, and so forth). The process 300 may include obtaining impure uranium dissolved in an acidic solution in step 302. The process 300 may include evaporating the acidic solution to increase the uranium concentration and form a concentrated solution in step 304. The process 300 may include mixing $H_2O_2$ and optionally, NaOH, with the concentrated solution in a first container in step 306. The process 300 may include forming primary $UO_2O_2.4H_2O$ in the first container in step 308. Steps 302 to 308 may include procedures described in steps 102 to 108 of FIG. 1.

The process 300 may include transferring the supernate from the first container to a second container in step 310. The process 300 may include rinsing the primary $UO_2O_2.4H_2O$ and transferring the rinsed liquid to the second container in step 312. The process 300 may include mixing $H_2O_2$ into the second container in step 314. The process 300 may include forming secondary $UO_2O_2.4H_2O$ in the secondary container in step 316. Steps 310 to 316 may include all procedures described in step 110 of FIG. 1 to form secondary $UO_2O_2.4H_2O$.

The process 300 may include transferring the supernate from the second container to the third container in step 318, rinsing the secondary $UO_2O_2.4H_2O$ and transferring the rinsed liquid to the third container in step 320, and checking uranium content (i.e., checking uranium content in the liquid in the third container) in step 322. Steps 318, 320, and 322 may include all procedures described in steps 112, 114, and 120 of FIG. 1, respectively. With a precipitation efficiency of greater than about 90 wt. %, two stages of precipitations are sufficient to recover about 99 wt. % of uranium, e.g., less than about 1 wt. % uranium may be measured in step 322 when the liquid sample is taken from Container 3 that includes the supernate from Container 2 and the rinsed liquid.

The process 300 may optionally include forming more secondary $UO_2O_2.4H_2O$ in step 324. Step 324 may include all procedures described in step 110 (i.e., to form more secondary $UO_2O_2.4H_2O$ in Container 4, and so forth).

The process 300 may include collecting the primary and secondary $UO_2O_2.4H_2O$ at step 326. Step 326 may include collecting $UO_2O_2.4H_2O$ from all containers (e.g., Container 1, Container 2, Container 3, Container 4 . . . , etc.). The $UO_2O_2.4H_2O$ may be collected using pipetting, centrifuging, filtrating, or a combination thereof.

The process 300 may include washing and drying the collected $UO_2O_2.4H_2O$ at step 328 and checking purity of the washed and dried $UO_2O_2.4H_2O$ at step 330. Steps 328 and 330 may include all procedures described in steps 124 and 126 of FIG. 1. If the purity of the $UO_2O_2.4H_2O$ is satisfactory, e.g., equal to or greater than a predetermined purity (e.g., 99.99% pure, 99.9% pure, or 99.0% pure), the process 300 may proceed to step 322 to convert the washed and dried $UO_2O_2.4H_2O$ into $U_3O_8$. Step 322 may include all procedures described in step 128 of FIG. 1. If the purity of the $UO_2O_2.4H_2O$ is unsatisfactory, e.g., below the predetermined purity, the process 300 may proceed to step 324 to dissolve all of the washed and dried $UO_2O_2.4H_2O$ in $HNO_3$, and the process 300 may return to step 302 to form purer $UO_2O_2.4H_2O$. In some processes, step 330 may be omitted, and the process 300 may proceed directly from step 328 to step 332.

Example 1

Figure 4:
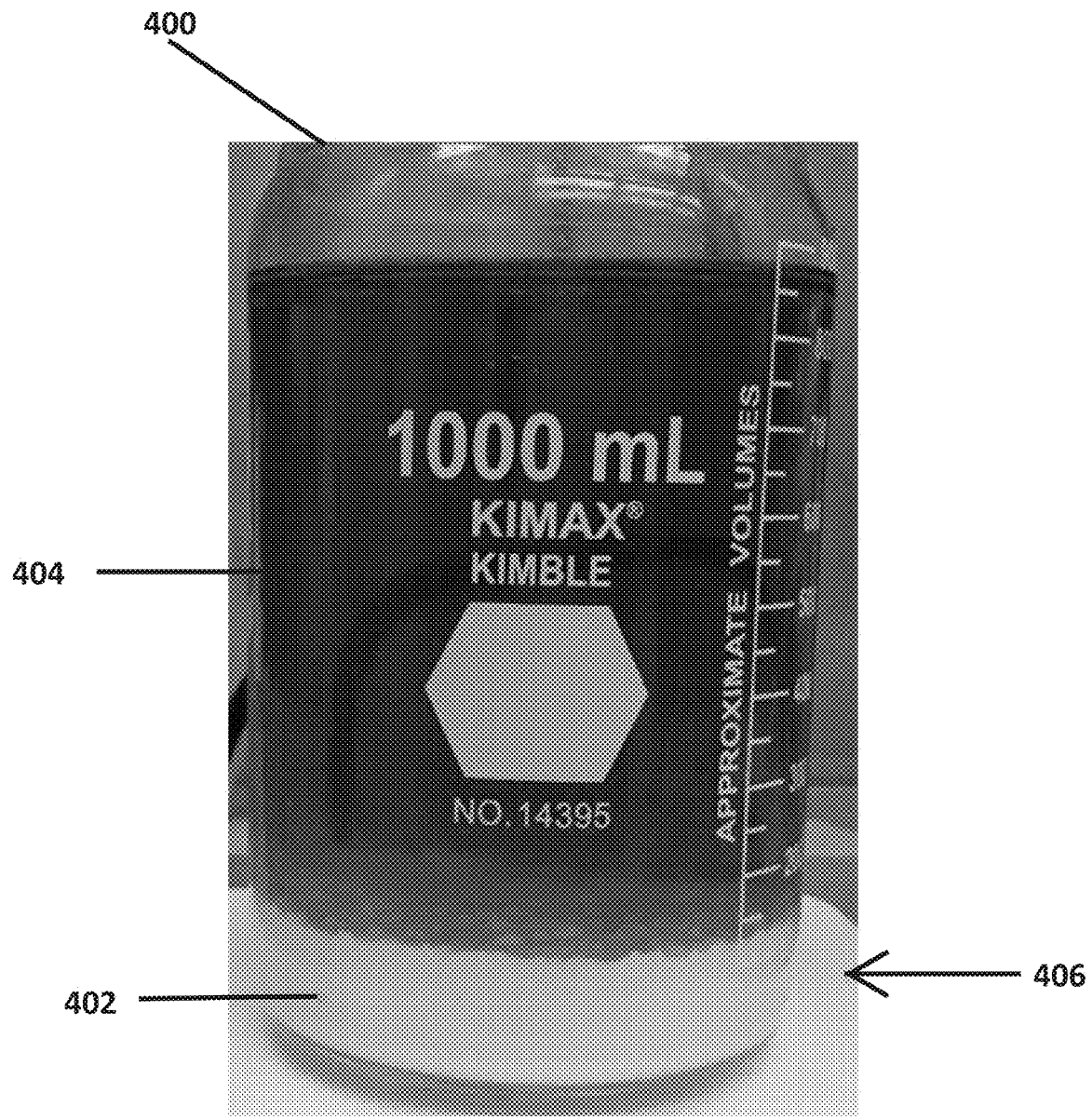
FIGS. 4-6 illustrate exemplary intermediate products generated by forming uranyl peroxide precipitates.
Figure 5:
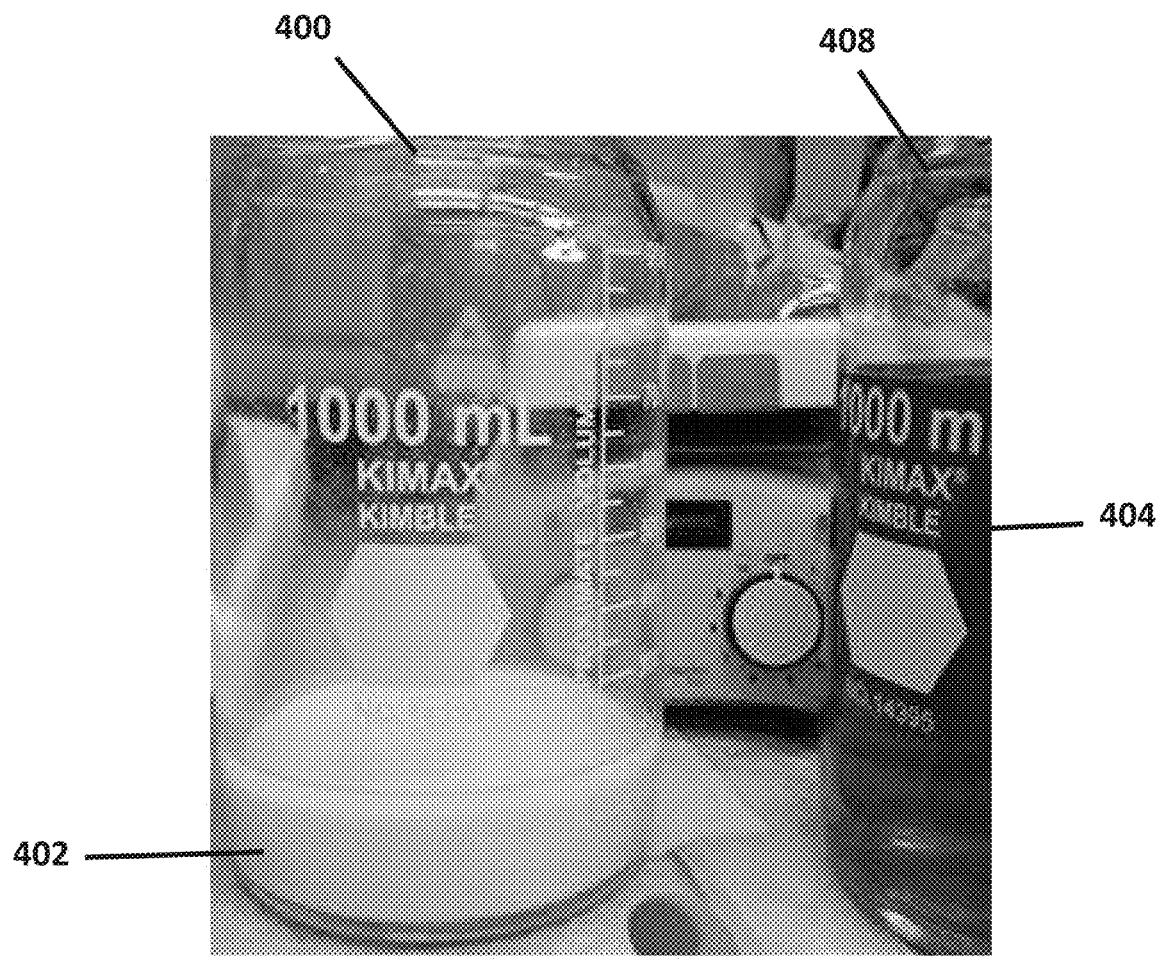
Figure 6:
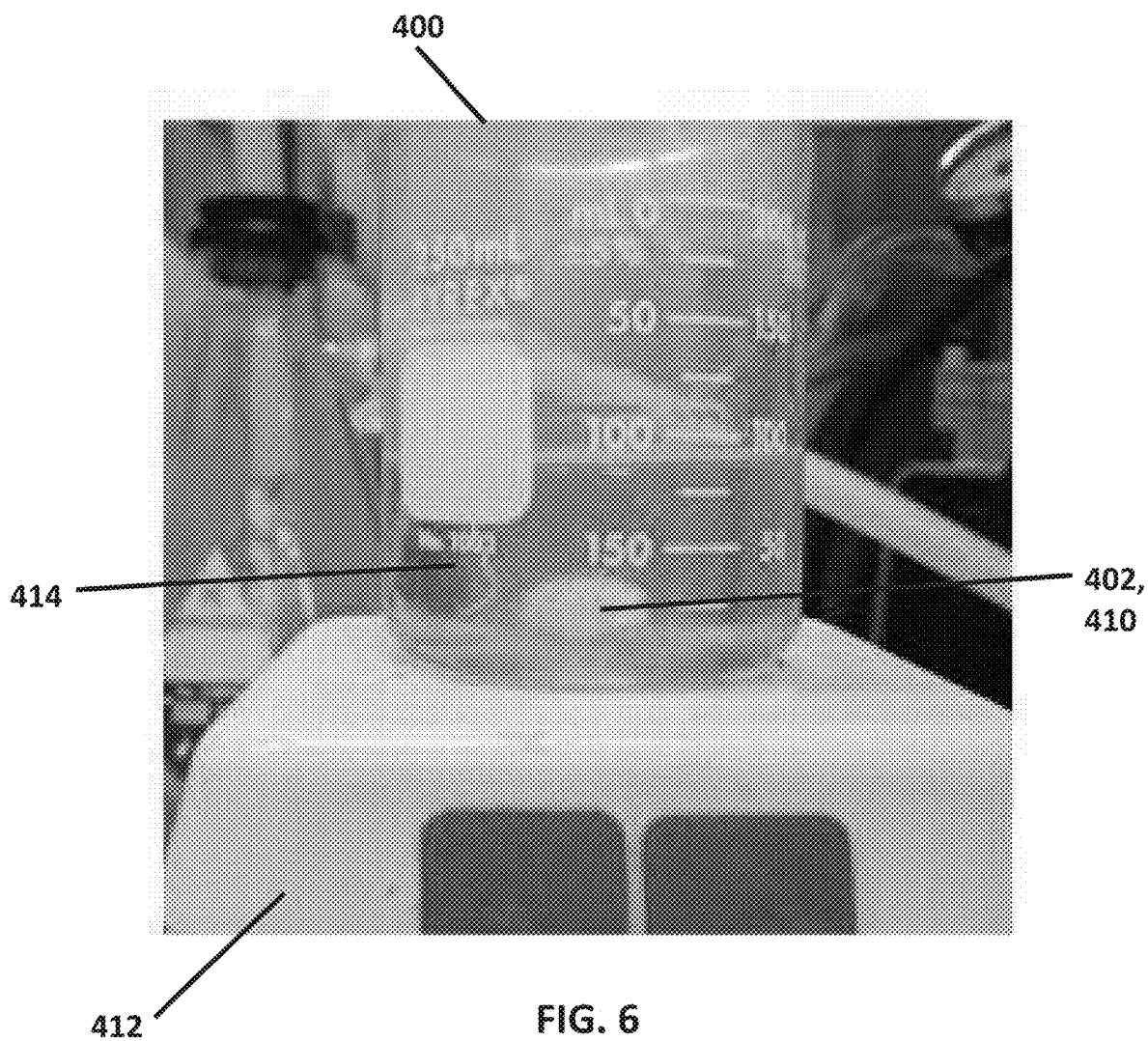

Based on the processes 100, 200, and 300 described, an exemplary uranium purification experiment was performed, and the results are discussed below. A cascade uranyl peroxide precipitation experiment was performed to purify uranium ($^{235}U$ in this example). In the illustrated experiment, the uranium solution (e.g., impure uranium dissolved in $HNO_3$) includes 47.41 g of $^{235}U$ containing impurities including 8.02 g of aluminum (Al), 1.52 g of iron (Fe), 3.10 g of copper (Cu), and 0.11 g of nickel (Ni). As shown in FIG. 4, a container 400 contains 1.6 M $HNO_3$, and with time the uranyl peroxide ($UO_2O_2.4H_2O$) precipitates 402 at the bottom of the container 400. The supernate 404 is near the top portion, separated from the precipitates 402 at a clear liquid/solid interface 406. The supernate 404 has a green color because of the presence to the metal impurities. FIG. 5 shows the supernate 404 transferred to another container 408 while the precipitates 400 remained in the container 400. FIG. 6 shows that additional $HNO_3$ solution 410 (e.g., about 2-4 M) was added to the container 400 to dissolve the precipitates 402 at an elevated temperature (e.g., around the boiling temperature of the $HNO_3$ solution) to form solution 412. Heat was supplied by a hot plate 412. The solution 414 including the dissolved precipitates 400 and the $HNO_3$ solution 410 is brown/yellow in color, which may indicate that the precipitates 400 may to be further purified.

Analysis was performed on a sample of the solution 414. The analysis indicates that the recovered uranium from the primary precipitation (e.g., the precipitates 402 from the container 300) was 54% of the total 47.41 g of $^{235}U$, which confirms the necessity of further precipitation of the supernate 404 to recover even more uranium. Thus, the cascade uranyl peroxide precipitation process was continued to form secondary precipitations (e.g., in Container 2, Container 3, Container 4, and so on). The uranyl peroxide precipitates formed from the supernate 404 in the container 408 was at least 54% (with controlled reduced acidity, the precipitation is highly likely to be higher than 54%). After two stages of precipitations (e.g., primary precipitation in container 400 or Container 1 and secondary precipitation in container 408 or Container 2), the remaining uranium in the supernate was less than about 21% of the original value (e.g., (100%–54%)$^2$=21.16%). The uranium remained in the supernate 304 was about 21.16% of the original 47.41 g of uranium, i.e., 10.05 g of uranium.

The uranyl peroxide precipitates (containing about 37.36 g of uranium) in containers 400 and 408 (Containers 1 and 2) may be collected, combined, and washed. Centrifuging or filtration technique provide better phase separation and precipitate washing. The collected precipitates may be re-dissolved in HNO$_3$ at an elevated temperature (e.g., about the boiling temperature of HNO$_3$), then set for precipitation to form a purer uranium.

The cascade uranyl peroxide precipitation process disclosed herein may be used in combination with conventional purification methods to purify uranium. For example, the amount of uranium formed in this experiment (e.g., 10.05 g) is an appropriate amount to be treated using a 300 mL anion exchange (AX) resin column for uranium purification. However, if the 47.41 g of raw $^{235}$U was directly treated using a MP-1 AX column, it would require at least four column runs batch-wise in 8-10 working days. Using the cascade uranyl peroxide precipitation method disclosed herein, the total process time may be significantly shortened, especially when a centrifuging or a filtration device is used.

As may be appreciated, the uranium recovery rate may be increased by increasing the precipitation efficiency. The precipitation efficiency may be increased by decreasing the acidity and/or by increasing the H$_2$O$_2$ concentration (e.g., by the evaporation process discussed in step 104 of FIG. 1 and/or by adding H$_2$O$_2$). In Example 1, if the precipitation started at acidity lower than 1.6 M [H$^+$] or [HNO$_3$], and/or the acidic solution was further evaporated (as described in step 104 of FIG. 1), the precipitation efficiency may be higher than 54%, for example, the precipitation efficiency may be 70%. With enhanced precipitation efficiency, the number of precipitation stages may be controlled within four rounds (e.g., primary precipitation in Container 1, and secondary precipitation in Containers 2, 3, and 4). If the precipitation efficiency was about 70%, then two stages of precipitations would be sufficient to recover about 91% (i.e., (1–0.7)$^2$=0.09, thus 9% uranium remains dissolved in the acidic solution). If the precipitation efficiency was about 90 wt. %, then two stages of precipitations would be sufficient to recover about 99.9 wt. % of uranium (i.e., (1–0.9)$^2$=0.01, thus 1 wt. % uranium remains dissolved in the acidic solution).

Example 2

Figure 7:
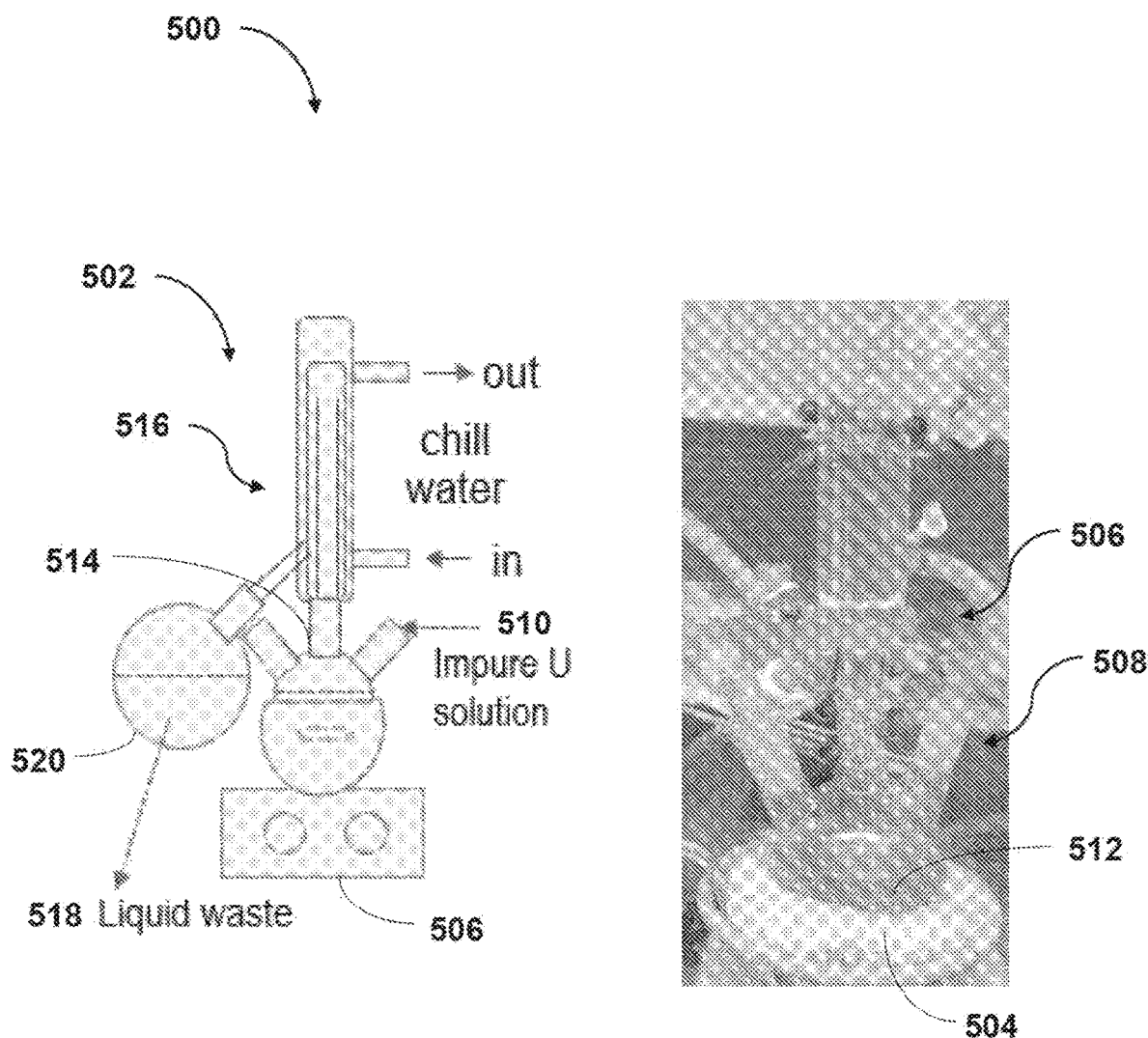
FIG. 7 illustrates an exemplary evaporation system used for evaporating the acidic solution in the processes of FIGS. 1-3.

Based on the processes 100, 200, and 300 described, another exemplary uranium purification process may also be performed. In this use case, a large amount of uranium (e.g., 100 g of uranium solution with 20 g of inert metal contaminants) was purified as follows:

Step 1: Dissolve the impure uranium with HNO$_3$ then concentrate the HNO$_3$ solution to increase the uranium concentration, i.e., HNO$_3$ solution of about 400 mL contains about 100 g uranium. The concentrated HNO$_3$ solution may be formed by the evaporation process described in step 104 of FIG. 1. The HNO$_3$ solution containing the dissolved impure uranium may be evaporated using an evaporation system 500 shown in FIG. 7. The evaporation system 500 may include an evaporation device 502, (e.g., an evaporation flask), and a heating device 504 configured to heat up the evaporation device 502 and the solution contained thereof. The evaporation system 500 may optionally include a stirrer, e.g., a magnetic stirrer. For example, the evaporation device 502 may be positioned on a magnetic stirrer hotplate 506. The evaporation device 502 may include one or more ports 508. For example, a first port 510 of the one or more ports 508 may be configured to allow intake of a solution 512, i.e., HNO$_3$ solution into the evaporation device 502. A second port 514 may be coupled to a condensation device 516 configured to condense the evaporated solution and collect which as a liquid waste 518 in a container 520. The condensation device 516 may include circulation of cold or chilled liquid, (e.g., water), to facilitate the condensation. As the evaporation system 500 increase the temperature of the HNO$_3$ solution to about the boiling temperature, condensation takes place. As more HNO$_3$ evaporates, the uranium concentration increases and the [HNO$_3$] at the end of the evaporation process may be greater than 8 M, about 15 M.

Step 2: In a 2-liter (L) beaker or bottle (bottle #1), increase the reactant concentration by adding and stirring H$_2$O$_2$/H$_2$O at 1:1 volume ratio. Add 400 mL or more of 30% H$_2$O$_2$ and deionized H$_2$O to bottle #1, to result in 800 mL of 7.5 M HNO$_3$ containing uranium at 125 g/L. Set bottle #1 aside for precipitation.

Step 3: If no precipitation occurs in bottle #1, add more 30% H$_2$O$_2$. If precipitation occurs, transfer the supernate to bottle #2 using any suitable techniques, such as pipetting, centrifuging, and/or filtrating. Subsequently, add more H$_2$O$_2$ (with small volume of NaOH if needed) to bottle #2. Set bottle #2 aside for precipitation.

Step 4: With time, the [H$^+$] in bottle #1 is expected to decrease and the liquid volume in bottle #2 is expected to increase. Wash the precipitates in bottle #1 thoroughly and transfer the wash liquid to bottle #2. The [H$^+$] in bottle #2 is expected to be lower than 7.5M due to the added wash liquid.

Step 5: Add 30% H$_2$O$_2$ or 30% H$_2$O$_2$+NaOH into bottle #2 for harvesting a second round of precipitates in bottle #2. Repeat the operations associated with step 3 to form precipitates in bottle #2.

Step 6: Continue operations in bottle #3. The un-precipitated uranium and all impurities may be passed on to the next bottle (bottle #4).

Step 7: This cascade operation may be continued until no residual uranium present in the supernate or when the next bottle contains only 10-15 g of $^{235}$U, which is an appropriate amount of uranium that may be treated with a 300-400 mL MP-1 AX column inside a glove box or a radiological hood. For example, the residual uranium and likely all 20 g of the inert metal impurities may be dissolved in 8M HNO$_3$ and be treated through the MP-1 AX column.

Step 8: Combine the precipitates from all bottles (bottle #1, bottle #2, etc.) and wash with 10:1 H$_2$O/H$_2$O$_2$, then with ultrapure ethanol, then air dry the solid. Take samples of solid uranyl peroxide and dissolve in 4M HNO$_3$ with applied heat (e.g., near boiling temperature of the HNO$_3$ solution), then analyze the impurity content using ICP-MS.

Step 9: If the analysis results indicate sufficiently pure uranyl peroxide precipitates, the precipitates are ready for conversion into U$_3$O$_8$. If further purification is needed, dissolve the precipitates in 4M HNO$_3$ with applied heat (e.g., near the boiling temperature of the HNO$_3$ solution) and repeat operations described in steps 2-3 for one more time, and steps 4-6 if necessary, until the purity meets the requirements.

In this example, if the 100 g of impure uranium with contaminants is treated using MP-1 AX column, the impure uranium will need to be divided into batches for eight to ten column runs. This will take a much longer time and will produce much more acidic liquid waste. Using the cascade uranyl peroxide precipitation method described herein, a large amount of impure uranium may be purified with easy operations, low equipment/material costs, and a shorter processing time. Furthermore, the cascade method described herein generates much less liquid waste as compared to the SX and IX methods. In general, the cascade method described herein may generate liquid waste that is about four times the volume of the concentrated solution (i.e., in step 104). In contrast, the liquid waste generated using the conventional approaches (e.g., SX and IX methods) may produce 60 to 100 times the volume of the concentrated solution.

If the disclosed cascade uranyl peroxide precipitation method is used to purify impure uranium including other actinides, the cascade method may result in the formation of uranium and other actinide peroxides. For example, co-precipitation of uranium and plutonium peroxides (U—Pu peroxides) will likely form in the $HNO_3$ solution, especially at low temperatures (e.g., <10° C.). Other actinides, such as neptunium (Np) and thorium (Th), may also form co-precipitated U—Np and/or U—Th peroxides in the $HNO_3$ solution, although these co-precipitates are not as stable as the U peroxide precipitates.

Chloride or sulfonate media may influence formation of uranyl peroxide precipitates. Eq. (1): $UO_2^{2+} + H_2O_2 + 4H_2O = UO_2O_2 \cdot 4H_2O + 2H^+$ above, expresses the chemical equilibrium of relevant species towards uranyl peroxide formation. Other chemical species, which may change the status of $UO_2^{2+}$, $H_2O_2$, and $H^+$, would influence the uranyl peroxide formation reaction (e.g., favorably or unfavorably). In uranium mining industry, $Cl^-$ and $SO_4^{2-}$ are anions that may influence uranyl peroxide formation unfavorably because these species may decrease $[UO_2^{2+}]$ in the liquor by complexing with $UO_2^{2+}$ as shown in Eq. (2) and (3) below.

$$UO_2^{2+} + Cl^- \rightleftharpoons UO_2Cl^+ \quad k=[UO_2Cl^+]/[UO_2^{2+}][Cl^-]= 0.88 \qquad \text{Eq. (2)}$$

$$UO_2^{2+} + 2SO_4^{2-} \rightleftharpoons UO_2(SO_4)_2^{2-} \quad k=[UO_2(SO_4)_2^{2-}]/\{[UO_2^{2+}][SO_4^{2-}]^2\} 710 \qquad \text{Eq. (3)}$$

As the result, the traditional uranyl peroxide precipitation method would require an additional step to remove $SO_4^{2-}$ by precipitation with CaO or $CaCl_2$.

The cascade process disclosed may alleviate the influence from anions because the high $[H^+]$ environment restrains the formation of these two anions as expressed in Equations (4), (5), and (6) below.

$$HCl \rightleftharpoons Cl^- + H^+ \qquad \text{Eq. (4)}$$

$$H_2SO_4 \rightleftharpoons HSO_4^- + H^+ \qquad \text{Eq. (5)}$$

$$HSO_4^- \rightleftharpoons SO_4^{2+} + H^+ \qquad \text{Eq. (6)}$$

As such, the cascade process disclosed herein may eliminate the need of a $SO_4^{2-}$ removal step.

Excessive addition of $NH_4OH$ may slow uranyl peroxide precipitation. In particular, the addition of excessive amount of $NH_4OH$ may generate $NH_3$, leading to formation of $UO_2(NO_3)Cl_3^-$ hydrophilic complex as expressed in Equation (7).

$$R_3N + HA \rightleftharpoons R_3N \cdot HA \quad A\text{—simple anions, e.g. } UO_2(NO_3)Cl_3^- \qquad \text{Eq. (7)}$$

The formation of $UO_2(NO_3)Cl_3^-$ hydrophilic complex decreases $[UO_2^{2+}]$, thus slows down the precipitation. It should be noted that in the traditional uranyl peroxide precipitation process in a very low acidity solution, $UO_2$ $(NO_3)Cl_3^-$ hydrophilic complex may not form in the pH range of the uranium solution, thus no formation of $R_3N \cdot HA$.

The disclosed cascade method is different from the traditional uranyl peroxide precipitation method at least in ways discussed herein and may have several advantages over the traditional uranyl peroxide precipitation method. Traditionally, uranyl peroxide precipitation was formed in near neutral condition or very low acidic conditions (e.g., pH=2-8 or about 6). Controlled amounts of a basic solution, i.e., $NH_4OH$, were added into the solution to neutralize the $[H^+]$ generated on the right side of the Eq. (1) to maintain the acidity around pH=6. In the traditional approach, local alkalization of the uranium solution inevitably results in formation of hydrolytic impurities (e.g., nickel hydroxide, $Ni(OH)_2$, iron hydroxide, $Fe(OH)_3$, etc.) in localized basic zone in the solution during addition of the basic solution.

Figure 8:
FIGS. 8-9 is comparison of uranyl peroxide precipitates formed from a traditional approach and the precipitates produced using the processes of FIGS. 1-3.
Figure 9:

FIG. 8 shows exemplary uranium peroxide precipitates formed using the traditional approach. The orange color spots 600 indicate the presence of hydrolytic uranium. Because it is energetically more favorable for other impurities to form hydroxides than uranium, the formation of hydrolytic uranium indicates that other metal hydroxides (e.g., $Ni(OH)_2$, $Fe(OH)_3$, etc.) are also present in the uranium peroxide precipitates formed via the traditional approach. Re-dissolving the hydrolytic impurities in low acidic condition is kinetically slow, thus generation of the hydrolytic impurities in the traditional uranyl peroxide precipitation method is problematic. For comparison, FIG. 9 shows exemplary uranyl peroxide precipitates formed using the cascade method. The uranyl peroxide precipitates in FIG. 9 are free or substantially free of hydrolytic uranium and other hydrolytic impurities (e.g., $Ni(OH)_2$, $Fe(OH)_3$, etc.).

Figure 14:
FIGS. 10-14 illustrate exemplary intermediate products in re-dissolving uranyl peroxide precipitates formed from the processes of FIGS. 1-3.
Figure 13:
Figure 12:
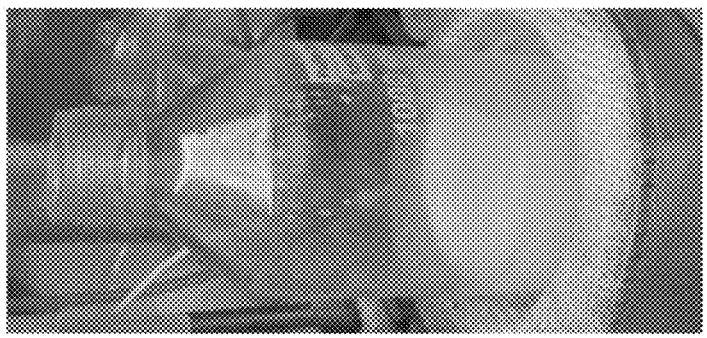
Figure 11:
Figure 10:

Until the cascade method disclosed herein, there has not been knowledge to re-dissolve the solid uranyl peroxides. Traditionally, impure solid uranyl peroxides are treated by calcination to convert into uranium oxides, and then re-dissolving the uranium oxides in an acid, and restarting the purification again. For this reason, if the quality of the uranyl peroxides of the first batch is unsatisfactory, it may be a long process to treat the uranyl peroxides for the second round of uranyl peroxide precipitation. Using the disclosed cascade method uranyl peroxides may be re-dissolved in $HNO_3$, and the $[HNO_3]$ may be as low as 4 M if heat is applied (e.g., near the boiling temperature of $HNO_3$). FIGS. 10-14 show exemplary formation and re-dissolution of uranyl peroxide precipitates in $HNO_3$ using the cascade method disclosed herein. FIG. 10 shows formation of uranyl peroxide precipitates in 7.5 M $HNO_3$ attributed by the addition of $H_2O_2$ into the concentrated $HNO_3$ solution. In FIG. 11, uranyl peroxide precipitates are not dissolved as more $HNO_3$ is added (e.g., the uranyl peroxide precipitates are not re-dissolved with the added $HNO_3$ without applied heat). In FIGS. 12-14, as heat (e.g., up to near boiling temperature of $HNO_3$) is applied to the $HNO_3$ solution, the color of the solution changes with increasing temperature, and the uranyl peroxide precipitates are re-dissolved.

The traditional uranyl peroxide precipitation method may require high precision control of using $NH_4OH$ to avoid formation of hydrolytic uranium and hydrolytic impurities. Nevertheless, the formation of hydrolytic impurities is inevitable using the traditional approach. Using the cascade method disclosed, formation of hydrolytic uranium and other impurity hydroxides may be substantially or completely avoided.

In one example, a total 67 g of $^{234}$U (one of uranium isotopes) was purified by IX method to high purity in two batches. To achieve even higher purity, the two batches of purified uranium was further purified by the uranyl peroxide precipitation methods. The first batch was purified using the traditional precipitation approach and resulted in a 93.4% recovery rate with a total impurity of 1938 ppm that includes 38.2 parts per million (ppm) iron (Fe). The second batch was purified using the cascade uranyl peroxide precipitation method disclosed herein and resulted in a 97.98% recovery rate with a total impurity of 1486 ppm that includes less than 12.4 ppm Fe (i.e., below the detection limit).

Furthermore, the uranyl peroxide precipitates formed using the traditional approach tend to be very fine in size and sticky, making the filtration, separation, and handling processes difficult. The uranyl peroxide precipitates formed using the cascade method disclosed herein are relatively larger in particle size and non-sticky, making the filtration, separation, and handling processes relatively easy.

When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "about" encompasses variances between one and five percent or an exact percent in that range that excludes other percentages in that range that may be associated with the particular variable.

While each of the methods shown and described may stand alone, they also may be encompassed within other methods including any number (N) of iterations of some or all of the process used, for example. Alternate systems may include any combination of functions described or shown in one or more of the FIGS. These processes are formed from any combination of structures and functions described. Some alternate processes illustratively disclosed herein may be practiced in the absence of any element or function that is not specifically disclosed herein. Thus, in these alternate processes, when elements and/or functions are not disclosed herein, those alternate systems are devoid of or operate in the absence of those non-disclosed elements and/or functions. In yet another alternate process, the disclosed elements and functions are recited individually, rather than as an inseparable whole. In these alternate processes, one or more but not all of the recited elements and functions disclosed herein may be completely lacking or may be excluded from these alternate processes.

Other systems, methods, features and advantages will be, or will become, apparent to one with skill in the art upon examination of the figures and detailed description. It is intended that all such additional systems, methods, features, and advantages be included within this description, be within the scope of the disclosure, and be protected by the following claims.

What is claimed is:

1. A method for purifying uranium, the method comprising:
    forming primary uranyl peroxide precipitates (UO$_2$O$_2$.4H$_2$O), comprising:
        obtaining impure uranium dissolved in an acidic solution;
        evaporating the acidic solution to increase uranium concentration and form a concentrated solution;
        mixing a hydrogen peroxide (H$_2$O$_2$) solution with the concentrated solution in a first container; and
        forming the primary uranyl peroxide precipitates in the first container;
    collecting the primary uranyl peroxide precipitates;
    washing and drying the primary uranyl peroxide precipitates; and
    converting the washed and dried primary uranyl peroxide precipitates into triuranium octoxide (U$_3$O$_8$).

2. The method of claim 1, wherein the acidic solution comprises nitric acid, and
    wherein the obtaining of the impure uranium comprises dissolving impure uranium in the acidic solution having a molar concentration of the nitric acid in a range of 2 moles per liter (M) and 8 M.

3. The method of claim 1, wherein the acidic solution comprises nitric acid, and
    wherein the evaporating of the acidic solution comprises evaporating the nitric acid using an evaporation system to form the concentrated solution having a molar concentration of the nitric acid that is greater than 8 moles per liter.

4. The method of claim 1, wherein the H$_2$O$_2$ solution comprises 30-50 vol. % H$_2$O$_2$ and the remainder of the H$_2$O$_2$ solution is water,
    wherein the mixing of the H$_2$O$_2$ solution with the concentrated solution comprises adding and stirring the H$_2$O$_2$ solution with the concentrated solution, and
    wherein the H$_2$O$_2$ solution is at a 1:1 or higher volume ratio with respect to the concentrated solution.

5. The method of claim 1, wherein the collecting of the primary uranyl peroxide precipitates comprises a technique selected from the group consisting of pipetting, centrifuging, filtrating, and combinations thereof.

6. The method of claim 1, wherein the washing of the primary uranyl peroxide precipitates comprises washing the primary uranyl peroxide precipitates with an additional H$_2$O$_2$ solution, and
    wherein a H$_2$O:H$_2$O$_2$ volumetric ratio of the additional H$_2$O$_2$ solution is about 10:1.

7. The method of claim 6, comprising subsequently washing the primary uranyl peroxide precipitates with ethanol.

8. The method of claim 1, further comprising:
    dissolving a portion less than all of the washed and dried primary uranyl peroxide precipitates in an acidic solution to determine purity of the primary uranyl peroxide precipitates.

9. The method of claim 8, wherein, when a determined purity of the washed and dried primary uranyl peroxide precipitates is below a predetermined value, the method further comprises:
    dissolving all of the washed and dried uranyl peroxide precipitates in a nitric acid solution.

10. The method of claim 1, further comprising:
    transferring a supernate from the first container to a second container;
    adding a rinsed liquid to the second container; and
    forming secondary uranyl peroxide precipitates in the second container.

11. The method of claim 10, further comprising:
    rinsing the primary uranyl peroxide precipitates in the first container following the transfer of the supernate to the second container.

12. A method for purifying uranium in one stage, the method comprising:
    obtaining impure uranium dissolved in an acidic solution comprising nitric acid (HNO$_3$);
    evaporating the acidic solution to increase uranium concentration and form a concentrated solution;

mixing a hydrogen peroxide ($H_2O_2$) solution with the concentrated solution to form uranyl peroxide precipitates ($UO_2O_2 \cdot 4H_2O$);

collecting the uranyl peroxide precipitates;

washing and drying the uranyl peroxide precipitates; and converting the washed and dried uranyl peroxide precipitates into triuranium octoxide ($U_3O_8$).

13. The method of claim 12, wherein the $H_2O_2$ solution comprises 30-50 vol. % $H_2O_2$ and the remainder of the $H_2O_2$ solution is water, wherein the mixing of the $H_2O_2$ solution with the concentrated solution comprises adding and stirring the $H_2O_2$ solution with the concentrated solution, and wherein the $H_2O_2$ solution is at a 1:1 or higher volume ratio with respect to the concentrated solution.

14. The method of claim 12, wherein the collecting of the uranyl peroxide precipitates comprises a technique selected from the group consisting of pipetting, centrifuging, filtrating, and combinations thereof.

15. The method of claim 12, wherein the washing of the uranyl peroxide precipitates comprises:

washing the uranyl peroxide precipitates with an additional $H_2O_2$ solution, wherein a $H_2O:H_2O_2$ volumetric ratio of the additional $H_2O_2$ solution is about 10:1, and subsequently washing the uranyl peroxide precipitates with ethanol.

16. A method for purifying uranium in multiple stages, the method comprising:

forming primary uranyl peroxide precipitates ($UO_2O_2 \cdot 4H_2O$), comprising:

obtaining impure uranium dissolved in an acidic solution comprising nitric acid ($HNO_3$);

evaporating the acidic solution to increase uranium concentration and form a concentrated solution; and mixing a hydrogen peroxide ($H_2O_2$) solution with the concentrated solution to form the primary uranyl peroxide precipitates in a first container;

transferring a supernate from the first container to a second container;

forming secondary uranyl peroxide precipitates in the second container;

collecting the primary uranyl peroxide precipitates from the first container and the secondary uranyl peroxide precipitates from the second container to provide combined uranyl peroxide precipitates;

washing and drying the combined uranyl peroxide precipitates; and converting the washed and dried combined uranyl peroxide precipitates into triuranium octoxide ($U_3O_8$).

17. The method of claim 16, further comprising, following the transferring of the supernate:

rinsing the primary uranyl peroxide precipitates in the first container with a diluted $H_2O_2$ solution to provide rinsed primary uranyl peroxide precipitates and a rinsed liquid; and adding the rinsed liquid to the second container.

18. The method of claim 16, wherein the evaporating of the acidic solution comprises using an evaporation system to form the concentrated solution, and wherein a molar concentration of $HNO_3$ in the concentration solution is greater than 8 moles per liter.

19. The method of claim 16, wherein the $H_2O_2$ solution comprises about 30-50 vol. % $H_2O_2$ and the remainder of the $H_2O_2$ solution is water, wherein the mixing of the $H_2O_2$ solution with the concentrated solution comprises adding and stirring the $H_2O_2$ solution with the concentrated solution, and wherein the $H_2O_2$ solution is at a 1:1 or higher volume ratio with respect to the concentrated solution.

20. The method of claim 16, wherein the collecting of the primary uranyl peroxide precipitates and the secondary uranyl peroxide precipitates comprises a technique selected from the group consisting of pipetting, centrifuging, filtrating, and combinations thereof.

* * * * *